United States Patent
Browne et al.

(10) Patent No.: US 8,240,677 B2
(45) Date of Patent: Aug. 14, 2012

(54) ACTIVE MATERIAL BASED SEAL ASSEMBLIES

(75) Inventors: Alan L. Browne, Grosse Pointe, MI (US); Nancy L. Johnson, Northville, MI (US); William Barvosa-Carter, Ventura, CA (US); Geoffrey P. McKnight, Los Angeles, CA (US); Andrew C. Keefe, Santa Monica, CA (US); Christopher P. Henry, Newbury Park, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1583 days.

(21) Appl. No.: 11/077,493

(22) Filed: Mar. 9, 2005

(65) Prior Publication Data

US 2005/0206096 A1 Sep. 22, 2005

Related U.S. Application Data

(60) Provisional application No. 60/552,781, filed on Mar. 12, 2004.

(51) Int. Cl.
*F16J 15/02* (2006.01)
(52) U.S. Cl. .................. 277/628; 277/629
(58) Field of Classification Search .......... 277/628, 277/629, 650
See application file for complete search history.

(56) References Cited

U.S. PATENT DOCUMENTS

| | | | |
|---|---|---|---|
| 4,761,917 A | 8/1988 | Knecht et al. | |
| 4,805,347 A | 2/1989 | Smith | |
| 4,956,625 A | 9/1990 | Cardone et al. | |
| 5,046,285 A | 9/1991 | Fratini, Jr. et al. | |
| 5,668,744 A | 9/1997 | Varadan et al. | |
| 6,009,699 A | 1/2000 | Delvael | |
| 6,053,992 A * | 4/2000 | Wu et al. ............ | 148/402 |
| 6,176,934 B1 | 1/2001 | Nelson | |
| 6,393,765 B1 | 5/2002 | Goldstein et al. | |
| 6,485,029 B1 | 11/2002 | Moody et al. | |
| 6,489,871 B1 | 12/2002 | Barton | |
| 6,615,545 B2 | 9/2003 | Rogers, Jr. et al. | |
| 6,702,301 B1 | 3/2004 | Davies et al. | |
| 6,991,280 B2 * | 1/2006 | McKnight et al. ....... | 296/180.1 |
| 7,147,269 B2 * | 12/2006 | Aase et al. ............. | 296/180.1 |
| 2002/0074742 A1 * | 6/2002 | Quoiani .................. | 277/627 |
| 2002/0113380 A1 | 8/2002 | Clark | |
| 2002/0152688 A1 | 10/2002 | Dron | |
| 2004/0008853 A1 | 1/2004 | Pelrine et al. | |
| 2004/0038120 A1 | 2/2004 | Tsai et al. ............... | 429/66 |
| 2004/0194970 A1 * | 10/2004 | Eatwell et al. ........... | 166/387 |
| 2004/0253566 A1 | 12/2004 | Quinn et al. | |

OTHER PUBLICATIONS

"Silicon-Rubber Microvalves Actuated by Paraffin" NASA Tech Briefs NASA Tech Briefs Online by Category, Mechanics, http://www.nastech.com/Briefs/Sept04/NPO30519.html.
"Dielectric Elastomer Actuators in the Development of a 'Mechatronic Muscle'", Ailish O'Halloran et al., Department of Electronic Engineering, NUI, Galway Faculty of Engineering Research Day 2004 (3 pgs).
International Search Report mailed Jul. 14, 2006 for PCT/US05/07998 filed Mar. 9, 2005 corresponding to this application.

* cited by examiner

*Primary Examiner* — Jennifer Michener
*Assistant Examiner* — Monique Wills

(57) ABSTRACT

Active seal assemblies employing active materials that can be controlled and remotely changed to alter the seal effectiveness, wherein the active seal assemblies actively change modulus properties such as stiffness, shape orientation, and the like. In this manner, in seal applications tailored for vehicles such as in a vehicle door application, door opening and closing efforts can be minimized yet seal effectiveness can be maximized.

8 Claims, 7 Drawing Sheets

US 8,240,677 B2

ACTIVE MATERIAL BASED SEAL ASSEMBLIES

CROSS REFERENCE TO RELATED APPLICATIONS

The present application relates to, and claims priority to, U.S. Provisional Application Ser. No. 60/552,781 filed on Mar. 12, 2004, incorporated herein in its entirety.

BACKGROUND

This disclosure relates to seals and more particularly, to active material based seal assemblies for sealing opposing surfaces.

Current methods and assemblies for sealing opposing surfaces such as doors and trunk lids, for example, include the use of flexible elastic membranes and structures that compress upon pressing contact of the opposing surfaces to form a seal. Typical materials include various forms of elastomers, e.g., foams and solids, that are formed into structures having solid and/or hollow cross sectional structures. The geometries of the cross sections are varied and may range from circular forms to irregular forms having multiple slots, various internal cross section geometries, and extending vanes.

Sealing assemblies are typically utilized for sound, airflow, and/or fluid management. The seals generally are exposed to a variety of conditions. For example, in vehicle applications, door seals generally are exposed to a wide range of temperatures as well as environmental conditions such as rain, snow, sun, humidity conditions, and the like. They must also be resistant to abrasion and repeated cycling. Current materials utilized for automotive seals are passive. That is, other than innate changes in modulus of the seal material due to environmental stimuli, the stiffness and cross sectional geometries of the seal assemblies cannot be remotely changed or controlled.

Another problem with current seals is the tradeoff in seal effectiveness. Increasing the static interface pressure and/or area of the seal can generally increase seal effectiveness. However, in automotive applications, such as vehicle doors, the increased interface pressure and/or area of the seal can result in increased door opening and closing efforts.

Accordingly, it is desirable to have active seal assemblies that can be controlled and remotely changed to alter the seal effectiveness, wherein the active seal assemblies actively change shape, orientation and modulus properties. In this manner, in seal applications such as the vehicle door application noted above, door opening and closing efforts can be minimized yet seal effectiveness can be maximized.

BRIEF SUMMARY

Disclosed herein are active material based seal assemblies. In one embodiment, an active material based seal assembly comprises a seal structure comprising an active material adapted to change at least one attribute in response to an activation signal, wherein the change in the at least one attribute changes a modulus property and/or shape of the seal structure, wherein the active material comprises shape memory alloys, shape memory polymers, electroactive polymers, ferromagnetic shape memory alloys, magnetic materials, electrorheological fluids, electrorheological elastomers, magnetorheological fluids, magnetorheological elastomers, dielectric elastomers, ionic polymer metal composites, piezoelectric polymers, piezoelectric ceramics, various combinations of the foregoing materials; and a controller in operative communication with the active material adapted to selectively provide the activation signal.

A vehicle comprising at least two opposing surfaces; and an active material based seal assembly intermediate the at least two opposing surfaces, wherein the active material based seal assembly comprises a seal structure comprising an active material adapted to change at least one attribute in response to an activation signal, wherein the change in the at least one attribute changes a modulus property and/or shape of the seal structure, and a controller in operative communication with the active material adapted to selectively provide the activation signal, wherein the change in the at least one attribute changes a dimension of the seal structure.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
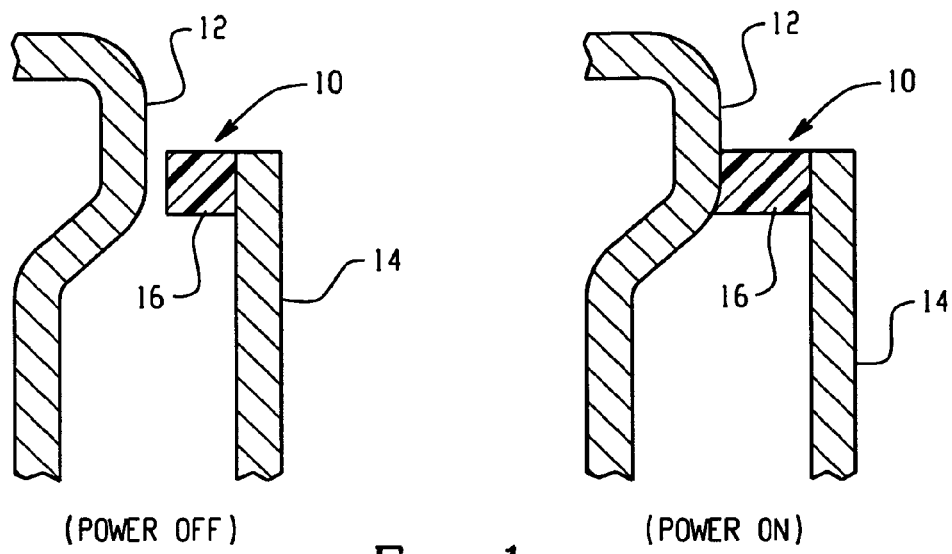
FIG. 1 is a cross section of an active material based seal assembly in accordance with one embodiment, wherein the active seal assembly is in the power-off and power on states.

Disclosed herein are active material based sealing assemblies and methods of use, wherein the shape, orientation, and/or modulus properties can be remotely activated and/or controlled to selectively provide increased seal effectiveness. For door applications, the active material based seal assemblies can be programmed to provide minimal opening and closing efforts in addition to the increased seal effectiveness properties. Although reference will be made herein to automotive applications, it is contemplated that the active material based seal assemblies can be employed for sealing opposing surfaces for various interfaces such as refrigerator doors, windows, drawers, and the like. For automotive applications, the active material based sealing assemblies are preferably utilized between an opening in a vehicle and a surface in sliding or sealing engagement with the opening such as a vehicle door, a side passenger sliding door, window, sunroof, hatch, tailgate, and the like.

The active material based sealing assemblies generally comprise an active material adapted for sealing engagement between two opposing surfaces, an activation device, and a controller in operative communication with the activation device for providing an activation signal to the active material. As will be described in greater detail below, the shape, orientation, and/or modulus properties of the active material can be selectively varied by means of an applied activation signal. The term "active material" as used herein refers to several different classes of materials all of which exhibit a change in at least one attribute such as dimension, shape, and/or flexural modulus when subjected to at least one of many different types of applied activation signals, examples of such signals being thermal, electrical, magnetic, mechanical, pneumatic, and the like. One class of active materials is shape memory materials. These materials exhibit a shape memory effect. Specifically, after being deformed pseudoplastically, they can be restored to their original shape in response to the activation signal. Suitable shape memory materials include, without limitation, shape memory alloys (SMA), ferromagnetic SMAs, and shape memory polymers (SMP). A second class of active materials can be considered as those that exhibit a change in at least one attribute when subjected to an applied activation signal but revert back to their original state upon removal of the applied activation signal. Active materials in this category include, but are not limited to, piezoelectric materials, electroactive polymers (EAP), magnetorheological fluids and elastomers (MR), electrorheological fluids (ER), electrostrictive polymers, ionic polymer gels, composites of one or more of the foregoing materials with non-active materials, combinations comprising at least one of the foregoing materials, and the like. The active material may be integrated within a seal structure or may define the complete active seal structure. Moreover, selective sealing can be effected by means of flexural modulus changes, shape changes, rotations, reorientation, and the like. Of the above noted materials, SMA- and SMP-based sealing assemblies may further include a return mechanism in some embodiments to restore the original geometry of the sealing assembly. The return mechanism can be mechanical, pneumatic, hydraulic, or based on one of the aforementioned active materials.

During operation, the active material can be configured to provide an enhancement to a closure mechanism or be configured to function as a mechanical closure device in addition to providing selective and controlled sealing engagement. In those applications where the active materials are integrated into the seal structure, the materials integrated with the active materials are preferably those materials already utilized for the manufacture of seals. For example, various rubbers, foams, elastomers, and the like can be utilized in combination with the active material to provide an active sealing assembly. As such, suitable seal materials include, but are not intended to be limited to, styrene butadiene rubber, polyurethanes, polyisoprene, neoprene, chlorosulfonated polystyrenes, various elastomers, and the like.

By utilizing an active material in the active material based seal assembly, the seal assembly can reversibly change its modulus and/or dimensional properties to provide improved sealing engagement between opposing surfaces, provide minimal effort to door opening and closing, as well as provide a closure mechanism, where desired and configured. Applying an activation signal to the active material can effect the reversible change. Suitable activation signals will depend on the type of active material. As such, the activation signal provided for reversibly changing the shape and modulus properties of the seal structure may include a heat signal, an electrical signal, a magnetic signal, and combinations comprising at least one of the foregoing signals, and the like.

Optionally, the active material based seal assembly may include one or more sensors that are used in combination with enhanced control logic to, for example, maintain the same level of sealing force independent of environmental conditions, e.g., humidity, temperature, pressure differential between a closed interior and the external environment, and the like.

As will be discussed in greater detail below, the active materials in the various embodiments described below can be used to fabricate the entire seal structure; can be configured to externally actively control the seal structure, e.g., provide actuator means, provide an exoskeleton of the seal structure; and/or can be configured to internally actively control the seal structure, e.g., provide the skeletal structure of the seal structure.

As previously discussed, the active materials permit the remote and automatic control of the sealing function and provide enhancements in sealing functionality through software modifications as opposed to hardware changes. For example, in the case of vehicle doors, control logic can be utilized to active the active material, i.e., seal assembly, upon opening or closing of the door. Switches can be disposed in the door handle or door pillars or doors in operative communication with sensors that activate the active material upon door motion, change in door gap with respect to the vehicle body, movement of the door handle, powered opening of lock assemblies, and the like. In this manner, opening and closing can be programmed with minimal effort or resistance as contributed by forces associated with the seal assembly.

The various applications that can be utilized with the active material based seal assemblies include, but are not intended to be limited to, seal assisted latching; noise reduction; door opening and closing force reduction; itch reduction and/or elimination; active actuator assisted sealing; power off sealing; power on sealing; and the like.

Referring now to the FIG. 1, there is shown an active material based seal assembly generally designated by reference numeral 10, wherein the active material base seal assembly 10 selectively exerts a force on an opposing surface 12 to provide effective seal engagement. This approach shows a version of power on sealing application. The active material based seal assembly 10 comprises an active material 16, which is attached to a rigid member 14 (e.g., a vehicle surface) in proximity to the opposing surface 12. The member 14 can be any component within the vehicle that forms a closure or seal, e.g., door frame, door, window, window frame, etc. The actual distance from the opposing surface 12 to the active material based seal assembly 10 generally depends on the amount of displacement provided by the particular active material 16 used in the active material based seal assembly 10. With a structure that provides a mechanical advantage, more displacement can be achieved from the active material but with a concomitant decrease in available force. Once the active material 16 is activated, the active material based seal assembly 10 will push against the opposing surface 12 so as to increase seal pressure and contact area to form an effective sealing engagement. In door applications, this would be advantageous over current passive seal technology because little effort must be expended to close the door. In the prior art, door closures generally require a force sufficient to compress the passive seal disposed between the door and opposing surface to obtain sealing engagement, thereby requiring substantial closure force to effect complete closure. By using the active material in the manner described, the force required for compression can be eliminated and/or minimized relative to prior art passive seal structures.

To effect the sealing engagement, the active material 16 undergoes a change in at least one attribute in response to an appropriate activation signal. For example, the active material 16 may be adapted to change a length dimension, shape, orientation, rotation and/or modulus property, for example, to the active material based seal assembly. It is the change in the at least one attribute that is manipulated to effect the sealing engagement, which can vary depending on the type of active material 16 employed.

Figure 2:
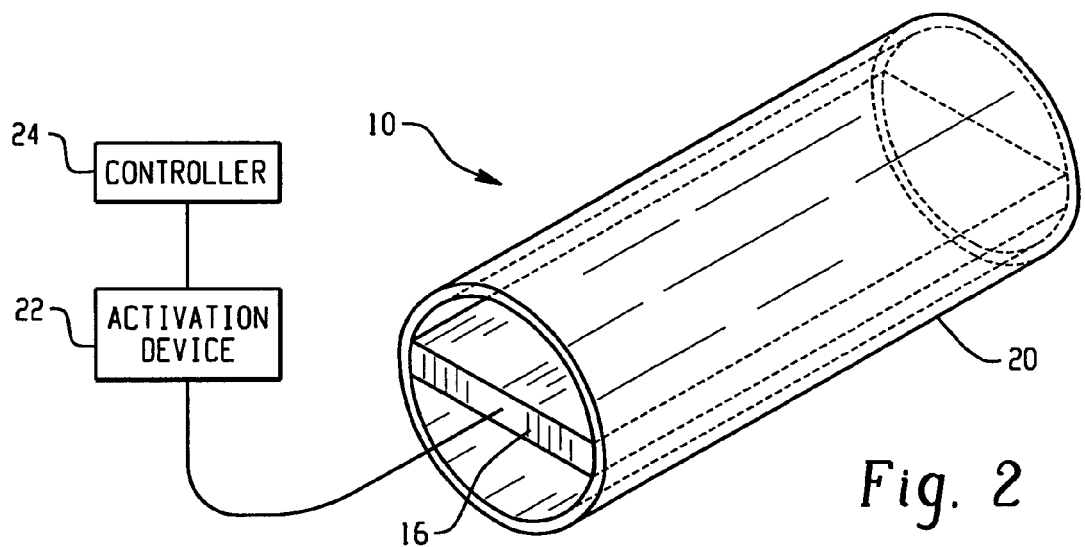
FIG. 2 is a perspective view of an active material based seal assembly in accordance with another embodiment.
Figure 3:
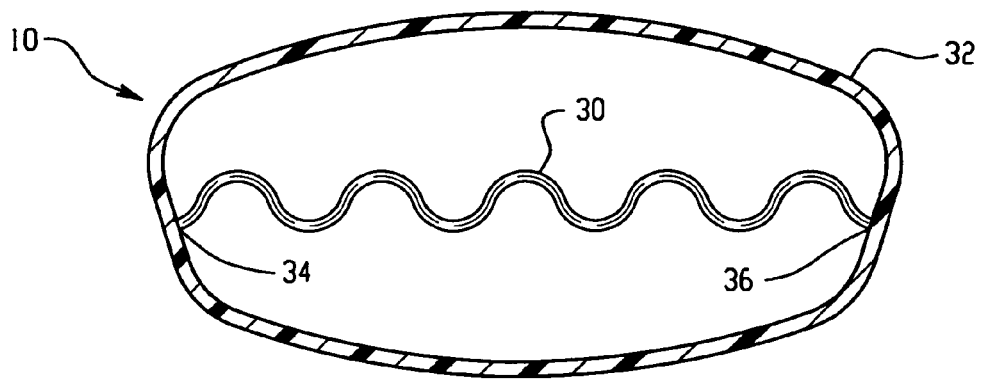
FIG. 3 is a cross section of an active material based seal assembly in accordance with another embodiment.

The active material based assembly 10 can be configured to take a variety of forms. In FIG. 2, the active material 16 is disposed within and along a length of an elastic tubular shaped body 20, wherein the active material 16 contacts the opposing surfaces defining the interior wall. The active material 16 is in operative communication with an activation device 22 and a controller 24. The controller 24 is adapted to accept various input signals from devices such as sensors (not shown) which can be used to determine, for example, the status of the door position, the vehicle speed, environmental conditions such as temperature and moisture content, and the like as may be desired. The controller 24 processes the input information and then sends an appropriate signal to the activation device 22. In turn, the activation device 22 provides a suitable activation signal to the active material 16 such that the desired at least one attribute is changed. In the embodiment, shown, activation of the active material 16 can change the shape of the elastic tubular body by expansion or contraction of the active material upon selective activation. It is understood that the following embodiments of active material seal assemblies would include an activation device controlled by a controller for selectively providing a suitable activation signal to the active material unless otherwise noted.

Several other embodiments to the active material based seal assembly 10 will now be described. In one embodiment, corrugated structures 30 are formed of the active material and are embedded within a tubular structure 32 formed of an elastic material. Each end 34, 36, of the corrugated structures 30 (one of which is shown) are attached in opposing fashion to the tubular structure 32 and thus, activation of such can change the shape thereof and cause a force to be exerted on seal. The corrugated structures 30 have the effect of allowing increased displacement from the active materials and increase the compliance of the active material to better match sealing requirements. Suitable active materials to use in the corrugated structure include shape memory alloys, piezoelectric composites and laminates, bi-morphs, and ionic actuators. The size and shape of the corrugations can be optimized for the intended application by those with skill in the art but generally may consist of between ½ and 100 periodic waveforms depending on the tubular structure 32 dimensions and the desired amount of displacement for the application. In addition, to better match force/deflection requirements, a number of thin corrugated structures may be used in parallel. Suitable materials for the outer covering material include elastomers and polymers.

Figure 4:
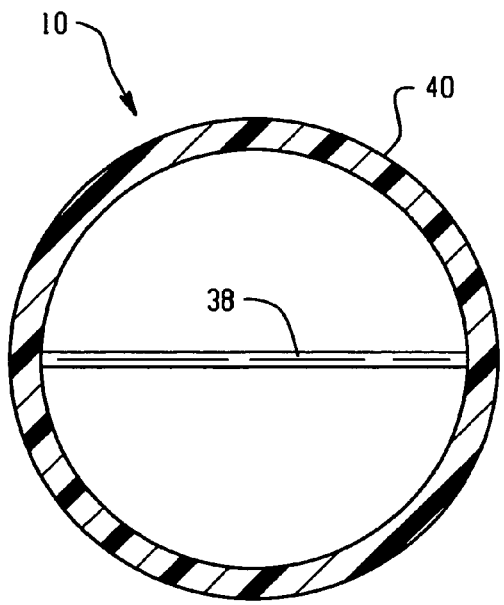
FIGS. 4 and 5 are a cross section and perspective view, respectively, of an active material based seal assembly in accordance with another embodiment.
Figure 5:
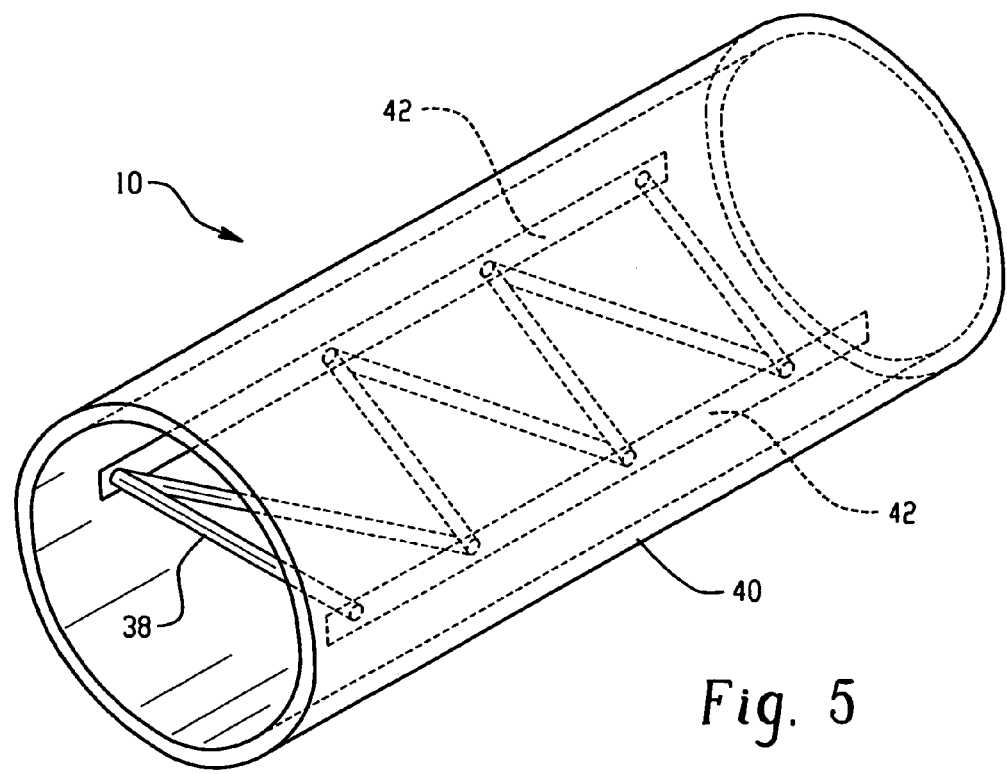

Turning now to FIGS. 4 and 5, there is shown another embodiment of the active material based seal assembly 10. The active material based seal assembly 10 includes a wire 38 that is formed of the active material, which is connected to a flexible outer covering 40 at various points along the longitudinal axis of the outer covering 40. Contraction of this wire 38 (e.g., by selective activation) will apply a force to the outer covering 40 and selectively change the seal dimensions. A rigid member 42 can be fixed to the outer covering 40 along the longitudinal length. The active material wire 38 is fixed to rigid member 42 to distribute the force across the longitudinal length of the outer covering 40. It should also be understood that a number of wires could be used such that the force is distributed along the length of the outer covering. The angle of the wire or bands 38 and number of connection points can be adjusted to achieve the desired deformation behavior. Furthermore, the outer covering 40 made be configured so as to provide a restoring force to the active material wire, if desired. Suitable active materials for this embodiment include shape memory alloys and conducting polymers. Suitable materials for the outer covering material include elastomers, polymers, and the like.

Figure 6:
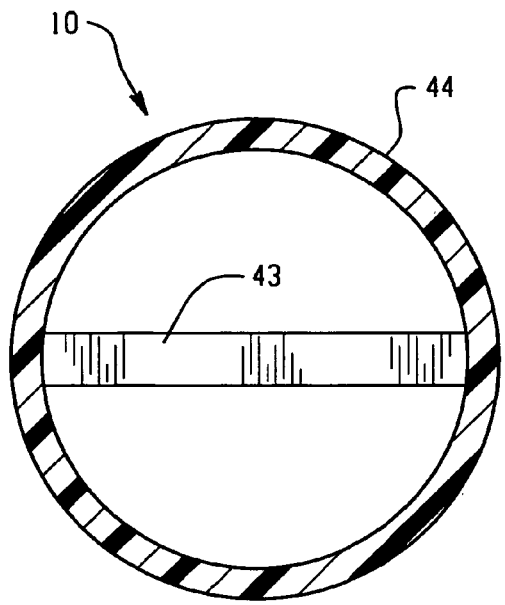
FIG. 6 is a cross section of an active material based seal assembly in accordance with another embodiment.
Figure 7:
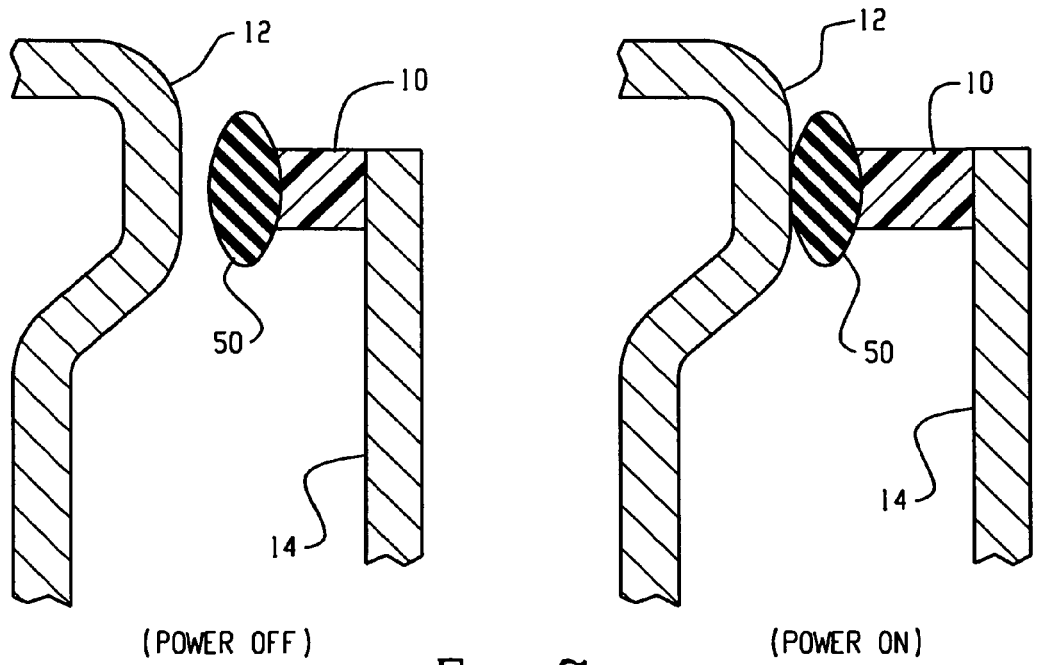
FIG. 7 is a cross section of an active material based seal assembly in accordance with another embodiment, wherein the active seal assembly is in the power-off and power on states.

Another embodiment of the active material based seal assembly 10 is shown in FIG. 6. In this embodiment, a strip 42 formed of the active material and attached to an outer seal covering 44 along the length of the seal assembly. In this embodiment, the active material is largely composed of a block of active material whose dimensions can be altered by the application of a suitable activation signal. A change in the shape of the active material strip 42 can change the shape of the outer seal covering 44, or change the force loading on the outer seal covering 44. The outer seal covering 44 may be constructed so as to provide a restoring force to the active material strip. Suitable materials for the active material strip include dielectric elastomers, conducting polymers, shape memory alloys, and the like. Optionally, as shown in FIG. 7, an elastic body 50 is disposed intermediate the active material based seal assembly 10 and the opposing surface 12. Depending on the intended application, the elastic body 50 can be attached directly to the opposing surface 12 or to the active material based seal assembly 10. In this manner, the change in at least one attribute to the active material causes the elastic body 50 to compress against the opposing surface 12 to selectively provide a sealing engagement between the door and doorframe, for example. Suitable active material based seal assemblies 10 include those generally configured as shown in FIGS. 2-6. However, the active material based seal assembly 16 need not be compliant itself, but rather is only required to provide extensional strain.

Figure 8:
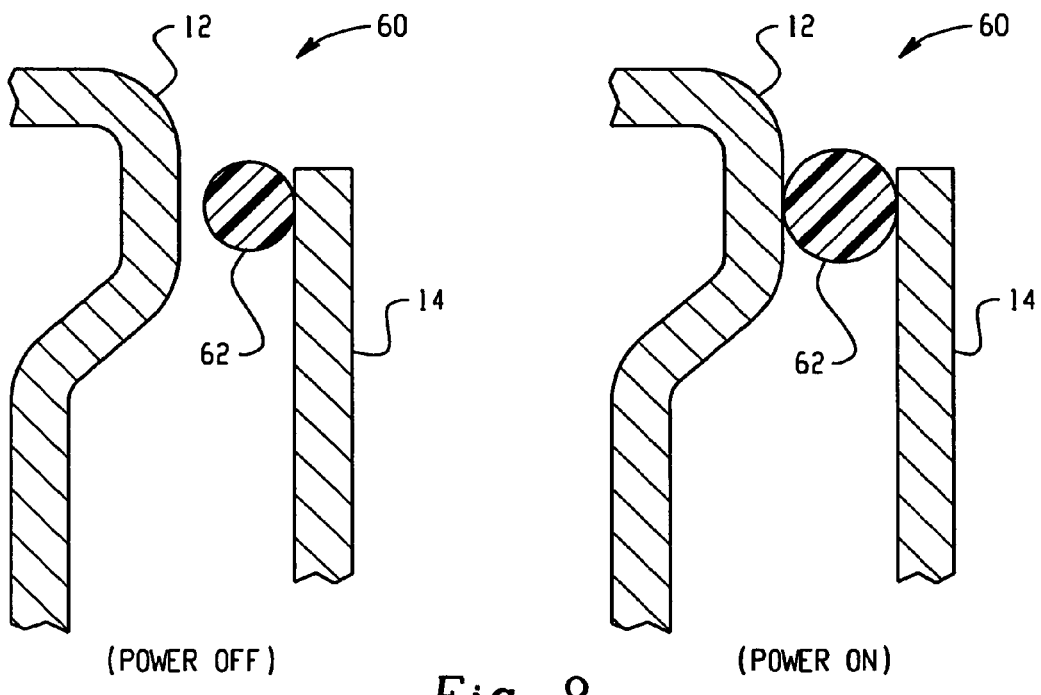
FIG. 8 is a cross section of an active material based seal assembly in accordance with another embodiment, wherein the active seal assembly is in the power-off and power on states.
Figure 9:
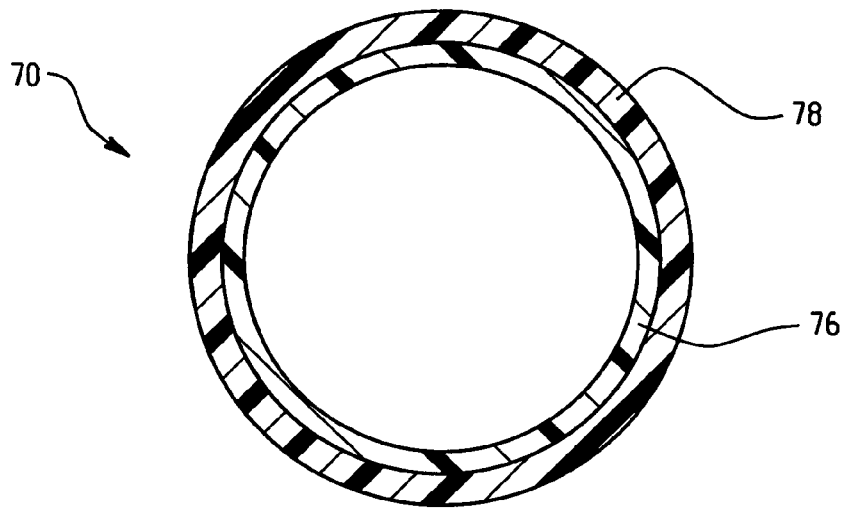
FIGS. 9 and 10 are a cross section and perspective view, respectively, of an active material based seal assembly in accordance with another embodiment.
Figure 10:
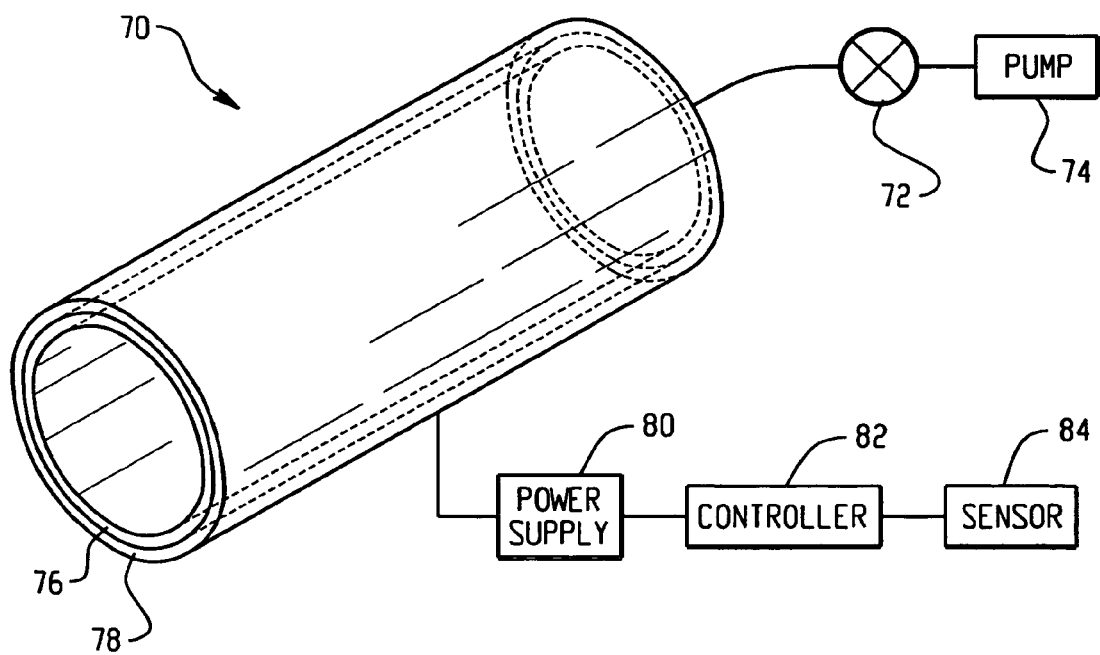

Another embodiment of an active material based seal assembly 60 is shown in FIG. 8. The active material based seal assembly 60 comprises an active material 62 that is adapted to change its dimension in the power on-mode such that upon activation the active material based seal assembly 60 expands. One exemplary embodiment of this type of seal is shown in FIGS. 9 and 10. As shown, an active material based seal assembly shown generally at 70 as a tubular structure is shown connected to a pressure inlet valve 72 and air supply or pump 74. The tubular seal structure 70 is composed of a dielectric elastomer material 76 and an elastic outer covering 78. Upon activating the dielectric elastomer material 76 by applying voltage supplied by the power supply 80, the tubular seal structure will expand and fill space. By reducing the voltage, the tubular seal structure reduces its diameter. A controller 82 based on input signals provided by a sensor 84, for example, can selectively apply an appropriate amount of voltage to the dielectric elastomer.

Figure 11:
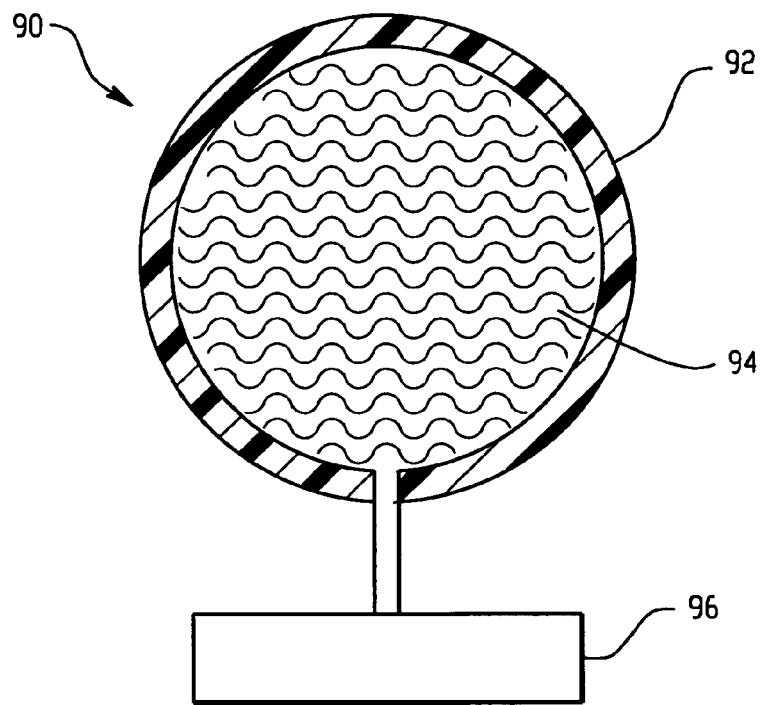
FIGS. 11 and 12 are a cross section and perspective view, respectively, of an active material based seal assembly in accordance with another embodiment.
Figure 12:
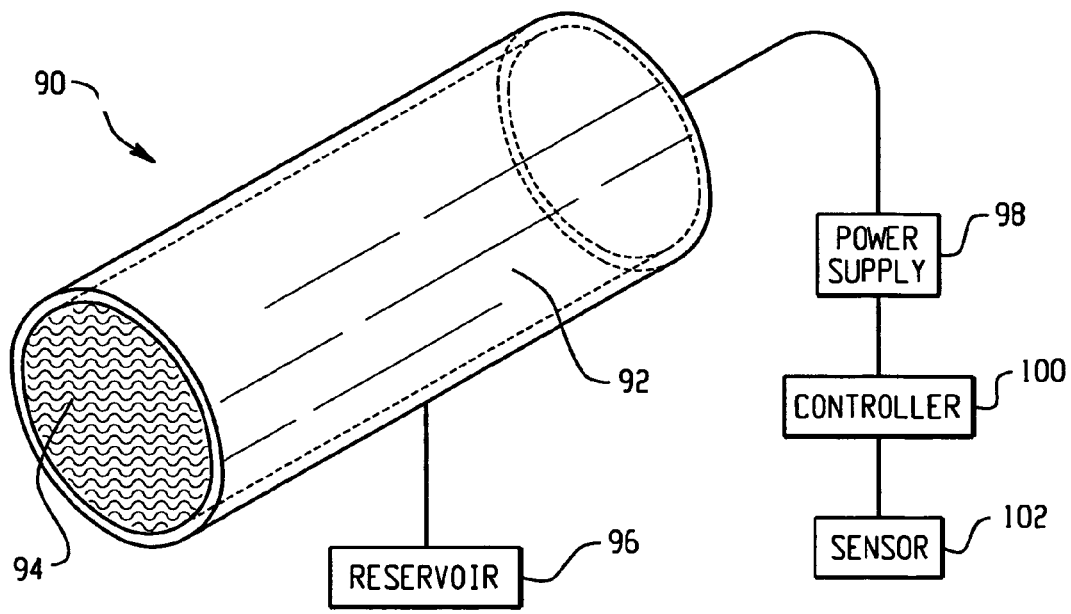

Another embodiment of the expanding seal is shown in FIGS. 11 and 12. In this embodiment, a tubular active material based seal assembly shown generally at 90 includes an elastic tubular body 92 filled with an electroactive polymer gel 94, which expands in volume by taking on water and other fluids upon application of an electrical signal. Reversing the electrical signal can reduce the volume. By applying appropriate-electrical signals to this electroactive polymer gel 94, fluid from a reservoir 96 can be used to expand the elastic tubular body 92 in diameter and provide additional sealing area and force. Power is applied through a control line from a power supply 98 that is controlled by a controller 100. The controller may receive various input signals from a sensor 102, for example, configured to detect the status of various vehicle components, environmental factors, and the like.

Figure 13:
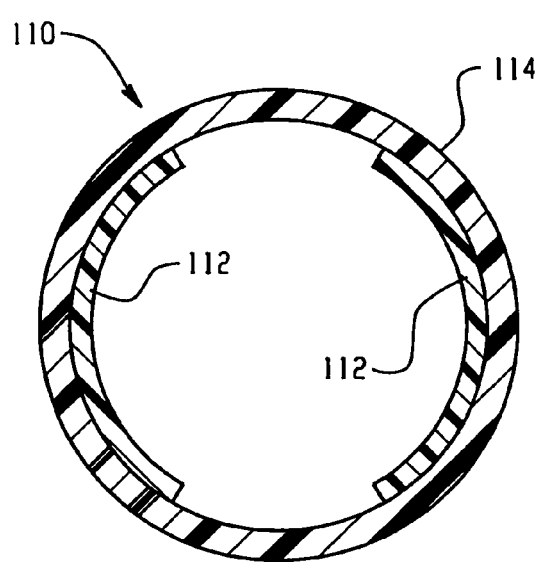
FIGS. 13 and 14 are a cross section and a perspective view, respectively, of an active material based seal assembly in accordance with another embodiment.
Figure 14:
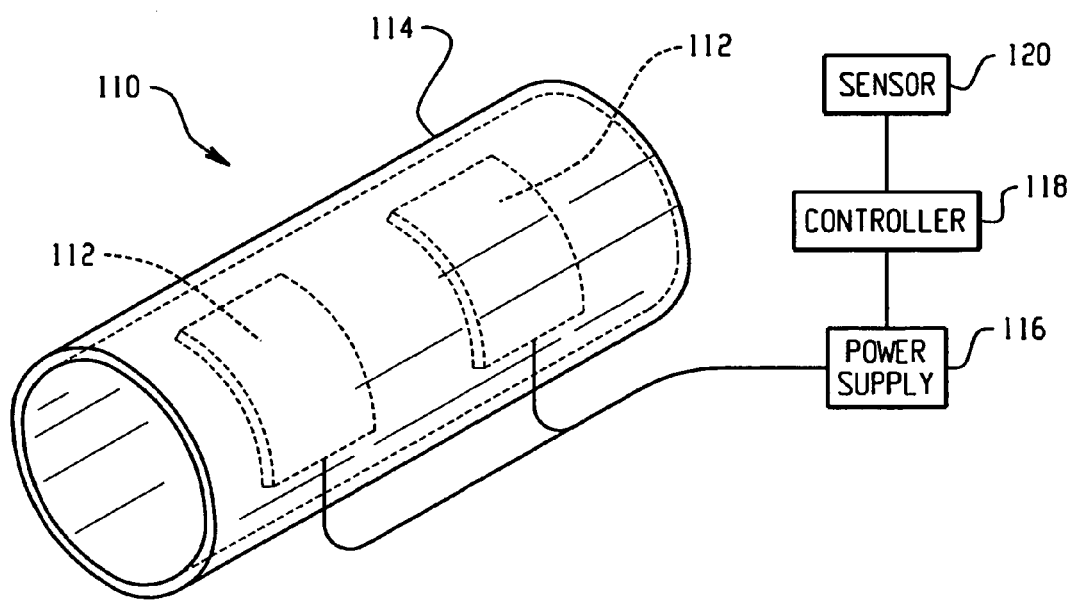

Another example of an expanding seal utilizes active material based bi-morph actuators affixed to the walls of a tubular outer covering material. For example, FIGS. 13 and 14 illustrate a tubular active material based seal assembly generally designated 110 including bimorph actuators 112 disposed on an interior wall of an elastic seal body 114. In this embodiment, activation of the bi-morph materials 112 causes an increase in the diameter of the seal body 114, or can alter the dimensions of the seal body 114 so as to provide additional sealing area and or closing force. In FIG. 13, the bimorph actuator elements 112 are affixed to the interior walls of an outer seal body 114 so that mechanical loads are transferred between them. The bimorph actuators 112 are activated via an electrical supply line from the power supply 116. The power supply 116 is controlled via a controller 118, which may use various input signals from sensors 120 disposed throughout the vehicle. The bimorph actuators 112 may be one of many active material solutions which provide this behavior including but not limited to piezoelectric bimorphs and unimorphs, conducting polymer bimorphs, IPMC's, shape memory alloy based bimorphs, and the like.

As such, power can be applied to activate the active material and cause contraction, reorientation, or rotation of the cross sectional geometry, and/or length dimension of the active material. Then, upon discontinuing the power causes expansion of the seal so as to provide effective sealing engagement between the active material and the opposing surface. This type of mechanism may be advantageous for those applications where it may be desired to provide effective sealing in the power off mode. For example, in opening a prior art passenger window, friction between a passive seal and the glass can result such that increased force is required for movement of the window to occur. By employing the active material as disclosed, the active seal assembly can eliminate and/or minimize the frictional forces associated with movement of the window and still provide effective sealing engagement upon discontinuation of the activation signal. The illustrated example is not intended to be limited to windows and can be employed for a number of applications where it may be desirable for the active seal assembly to function in the manner described.

Figure 15:
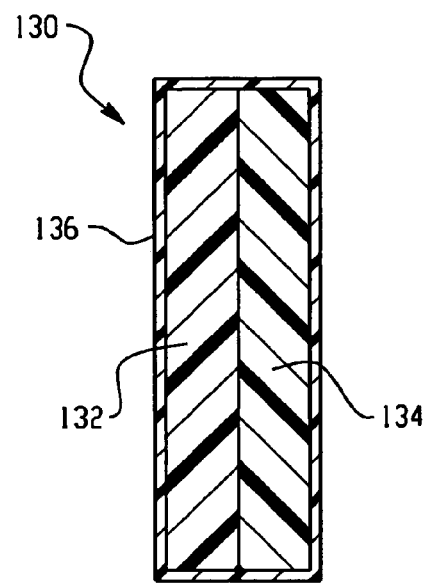
FIG. 15 is a cross section of an active material based seal assembly in accordance with another embodiment.

FIG. 15 illustrates an active seal for use in an active seal assembly in accordance with another embodiment. The active material based seal assembly 130 comprises a first layer 132 and a second layer 134. The first layer 132 is formed of an active material whereas the second layer 134 is formed of a passive (non-active) elastic material. Although reference is made to two layers, it should be appreciated that the active seal may comprise more than two layers. The additional layers may be formed of active material, which may be the same of different from the first layer 132 and/or may include additional passive layers, which may be the same or different from the second layer 134. Optionally, the active seal is encapsulated with a material 136 effective to provide protection from the environment during use. Suitable materials include cloths, membranes, elastic materials, and the like.

The active seal shown in FIG. 15 functions as a long cantilevered bending actuator. These can be unimorphs or bimorphs. In the literature, a unimorph actuator is composed of a single active material that can be driven to bend the cantilever in opposite directions by changing the sign of the control signal. Examples of materials for unimorphs are IPMCs, ionic polymer gels, (both of which move ionic species) piezoelectric polymers, electrostrictive polymers, piezoelectric ceramics and various combinations of the foregoing materials. A bimorph actuator is composed of two materials of either active material and an elastic material bonded to it along its length, or two active materials bonded along their length. When one of the component materials is made to deform the cantilever bends due to the differential length change of the active material versus the second the bonded material. In the cantilever configuration, the unimorph or bimorph become a portion of the seal assembly. In FIG. 15 the distal end of the cantilevered seal assembly 130 can be made to contact the opposing surface to contact a seal. For sealing applications, some materials may be appropriate themselves for the outer surface 136 of the seal 130, while others require a compliant coating material to improve the sealing surface. In this case, the basic unimorph or bimorph can be augmented with a coating of a highly compliant material that will help to form an effective moisture and sound seal when the seal material is, activated.

Bimorph configurations can be generalized to have normally bent left, right, or straight, have multilayers of active materials and elastic materials, non-uniform thicknesses, physical barriers or conduits for the active material control signal that preferentially bias the bending direction. In normally bent configurations, one of the active or elastic materials is bonded such that it is differentially longer or shorter than the second bimorph material. Multilayer configurations may also be used. Nonuniform thickness bimorphs may be used to bias the magnitude of cantilever bending to the left or right. Thickness variations may be used to achieve the desired bending behavior. Physical barriers or conduits on the exterior or at the material interface that preferentially bias the bending direction are useful mainly for unipolar signals such as ionic concentration (such a membrane barrier), pH, magnetic moment (such as a hard ferromagnetic layer), and radiation (such as a light barrier). Preferred materials are those which exhibit large elastic strain limits, and those which can efficiently store mechanical energy. Secondary considerations include those which may be easily bonded to the active material, have properties that are acceptable in the working temperature range, and have adequate toughness to survive repeated actuation. A bimorph may be created for any material in which the material may be driven to bend depending on the control signal. All manner of active materials may be used as a component of the bimorph as well as all manner of elastic materials, such as materials, polymers and ceramics. Additionally, it is recognized that thermoelastic materials may be used as bimorph materials. Therefore, most materials could be used for bimorph-type deformation.

Figure 16:
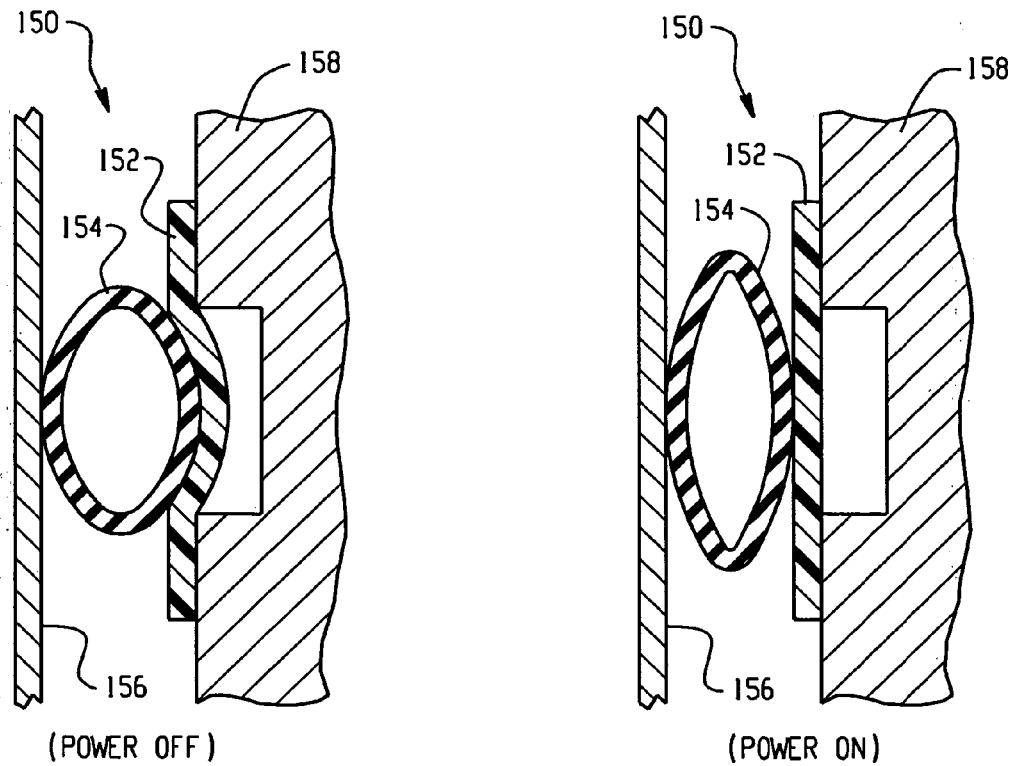
FIG. 16 is a cross section of an active material based seal assembly in accordance with one embodiment, wherein the active seal assembly is in the power-off and power on states.

FIG. 16 illustrates an active material based seal assembly 150 in accordance with another embodiment. The assembly 150 includes an active material and/or bistable structure 152 that changes shape, orientation and/or modulus so as to compress an elastic seal body 154 disposed on one surface 158 against an opposing surface 156. The seal body 154 can be attached to either the opposing surface 156 or to the active material and/or bistable structure 152. Surface 158 includes a recessed portion. The active material structure 152 covers the recessed portion, and in a power-off state, structure 152 is elastic to accommodate the in shape the seal body when pressed against it. Activation causes the active material and/or bistable structure 152 to decrease in length and become taut (i.e., increased stiffness) across the recessed portion so as to exert a pressure against the seal 154 against the opposing surface 156. In this embodiment, the shape, orientation or flexural modulus change to exert the force on the seal so as to compress the seal against the two opposing surfaces 156 and 158. An exemplary active material suitable for this application is a dielectric elastomer membrane, piezoelectric polymer membrane or shape memory alloy film.

Figure 17:
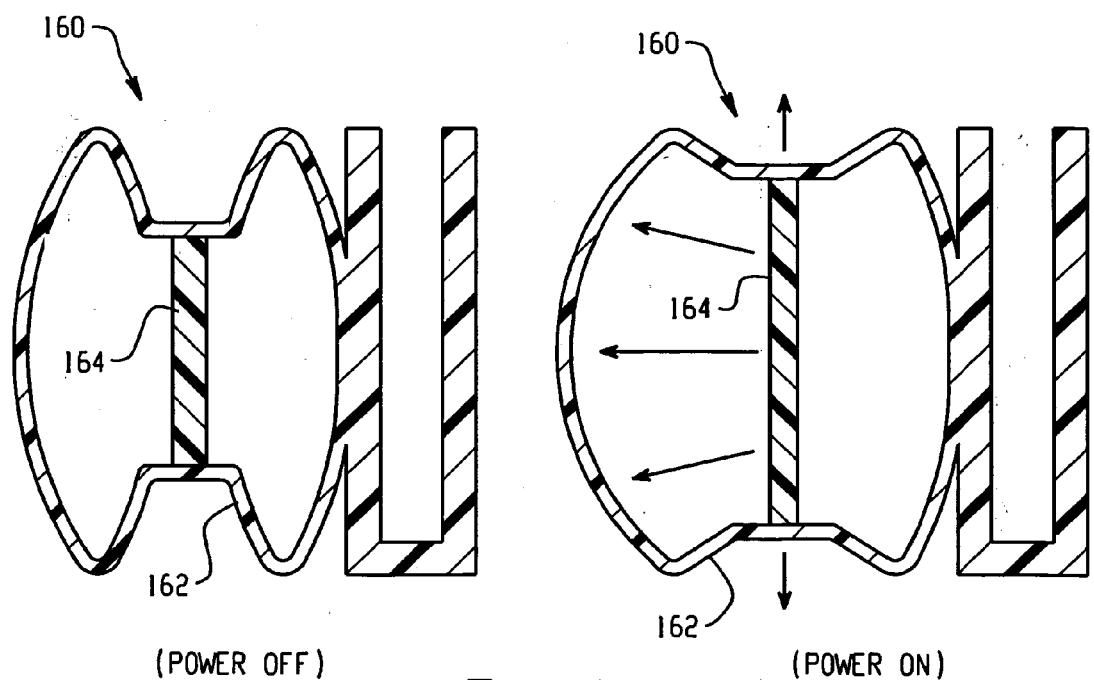
FIG. 17 is a cross section of an active material based seal assembly in accordance with one embodiment, wherein the active seal assembly is in the power-off and power on states.

FIG. 17 illustrates active material based seal assembly 160 in which the cross section of an elastic seal body 162 is designed to expand or contract in a direction normal to the seal force upon activation of member 164, which is formed of an active material. The seal cross section may provide mechanical stroke or force amplification for the active material disposed between two internal seal surfaces. An internal mechanical stroke or force amplification mechanism may be inserted between the active material and the seal cross section. Upon activation the active material extends or contracts against the amplification mechanism or the seal cross-section directly. Motion at certain locations of the seal cross-section cause the top surface of the seal to move (and hence some degree of force enhancement or reduction) in the sealing direction. In this manner, expansion of the active material based seal assembly provides contact against an opposing surface (not shown).

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; poly-acrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Shape memory polymers (SMPs) generally refer to a group of polymeric materials that demonstrate the ability to return to some previously defined shape when subjected to an appropriate thermal stimulus. The shape memory polymer may be in the form of a solid or a foam as may be desired for some embodiments. Shape memory polymers are capable of undergoing phase transitions in which their shape is altered as a function of temperature. Generally, SMPs are co-polymers comprised of at least two different units which may be described as defining different segments within the co-polymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. With regard to shape memory polymer foams, the structure may be open celled or close celled as desired.

In practice, the SMPs are alternated between one of at least two shapes such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). SMP foams are shaped at this temperature by blow molding or shaped with an applied force followed by cooling to set the permanent shape. The temperature necessary to set the permanent shape is generally between about 40° C. to about 200° C. After expansion by fluid, the permanent shape is regained when the applied force is removed, and the expanded SMP is again brought to or above the highest or last transition temperature of the SMP. The Tg of the SMP can be chosen for a particular application by modifying the structure and composition of the polymer.

The temperature needed for permanent shape recovery can generally be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acids), polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Conducting polymerization of different monomer segments with a blowing agent can be used to form the shape memory polymer foam. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'-dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes.

Suitable shape memory alloys generally exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy foam is preferably at or below the austenite transition temperature (at or below As). Subsequent heating above the austenite transition temperature causes the expanded shape memory foam to revert back to its permanent shape. Thus, a suitable activation signal for use with shape memory alloys is a thermal activation signal having a magnitude to cause transformations between the martensite and austenite phases. For those shape memory materials that are ferromagnetic, a magnetic and/or a thermal signal can be applied to effect the desired change in shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, changes in yield strength, and/or flexural modulus properties, damping capacity, superelasticity, and the like. A preferred shape memory alloy is a nickel-titanium based alloy commercially available under the trademark FLEXINOL from Dynalloy, Inc. Selection of a suitable shape memory alloy composition depends on the temperature range where the component will operate.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers of the present invention may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An active material based seal assembly adapted for use with an adjacent surface, said assembly comprising:
a seal structure comprising a non-active sealing member, and an active material operable to change at least one attribute in response to an activation signal, wherein the change in the at least one attribute changes a modulus property and/or shape of the seal structure, wherein the active material is selected from the group consisting essentially of shape memory polymers, electroactive polymers, magnetostrictive materials, electrorheological fluids, electrorheological elastomers, magnetorheological fluids, magnetorheological elastomers, dielectric elastomers, ionic polymer metal composites, piezoelectric polymers, piezoelectric ceramics, and various combinations of the foregoing materials; and
a controller in operative communication with the active material adapted to selectively provide the activation signal,
wherein the active material is drivenly coupled to the member, and configured to cause the member to selectively engage the surface, so as to form a seal therewith.

2. An active material based seal assembly, comprising:
a seal structure comprising a non-active sealing member, and an active material operable to change at least one attribute in response to an activation signal, wherein the change in the at least one attribute changes a modulus property and/or shape of the seal structure, wherein the active material is selected from the group consisting essentially of shape memory alloys, electroactive polymers, ferromagnetic shape memory alloys, magnetostrictive materials, electrorheological fluids, electrorheological elastomers, magnetorheological fluids, magnetorheological elastomers, dielectric elastomers, ionic polymer metal composites, piezoelectric polymers, piezoelectric ceramics, and various combinations of the foregoing materials; and
a controller in operative communication with the active material adapted to selectively provide the activation signal,
wherein the active material presents an elongated, non-circular geometric configuration, is drivenly coupled to the member and configured to laterally expand in response to the signal in one direction, has one lateral end fixedly attached to a rigid member, and a free end operable to cause the member to selectively engage a non-active seal component as a result of the change, so as to form a linearly acting active seal configuration.

3. The active material based seal assembly of claim 1, wherein the seal structure comprises a passive elastic member on a nonactive bistable structure, wherein the bistable structure is disposed over a recessed portion of a surface, and is separate from and drivenly coupled to the active material, the bistable structure is curvilinear with respect to the recessed portion upon discontinuation of the activation signal and substantially linear upon activation of the activation signal to sealingly force the passive elastic member against an opposing surface.

4. The active material based seal assembly of claim 1, wherein the seal structure comprises a first layer of the active material and a second layer of a passive elastic material.

5. The active material based seal assembly of claim 4, wherein the seal structure further comprises an encapsulating layer about the first and second layers.

6. The active material based seal assembly of claim 1, wherein the seal structure comprises an elongated tubular shaped body defining a cross-sectional diameter, and a length substantially greater than the diameter, and the active material is in operative communication with the body, wherein the active material dimensionally expands the tubular shaped body in response to the activation signal, so as to tangentially engage a surface opposite the seal structure.

7. The active material based seal assembly of claim 6, wherein the active material is a bimorphic piezoelectric actuator disposed on an inner surface of the tubular seal body.

8. The active material based seal assembly of claim 6, wherein the body defines an interior space, and the active material is disposed within the space and is coaxially aligned with the body, so as to coextend therewith.

* * * * *